(12) United States Patent
Ukita

(10) Patent No.: US 6,930,744 B1
(45) Date of Patent: Aug. 16, 2005

(54) LCD DEVICE HAVING TEST CONTACT PADS

(75) Inventor: Tooru Ukita, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/568,710

(22) Filed: May 11, 2000

(30) Foreign Application Priority Data

May 14, 1999 (JP) ................................. 11-134214

(51) Int. Cl.$^7$ ...................... G02F 1/1345; G01R 31/00; G01R 31/02
(52) U.S. Cl. ...................... 349/152; 349/149; 349/151; 349/192; 324/770
(58) Field of Search ............................... 349/149–152, 349/192, 54; 324/770

(56) References Cited

U.S. PATENT DOCUMENTS

| | | | | |
|---|---|---|---|---|
| 4,586,789 A | * | 5/1986 | Kishimoto et al. | 349/152 |
| 5,712,493 A | * | 1/1998 | Mori et al. | 257/59 |
| 5,742,074 A | * | 4/1998 | Takizawa et al. | 257/59 |
| 6,025,891 A | * | 2/2000 | Kim | 349/40 |
| 6,043,971 A | * | 3/2000 | Song et al. | 361/111 |
| 6,059,624 A | * | 5/2000 | Dehaine et al. | 445/24 |

FOREIGN PATENT DOCUMENTS

| | | | | | |
|---|---|---|---|---|---|
| JP | 3-29925 | | 2/1991 | | |
| JP | 6-110072 | | 4/1994 | | |
| JP | 07-092478 A | * | 4/1995 | ......... | G02F 1/1345 |
| JP | 11-202353 A | * | 7/1999 | ......... | G02F 1/1343 |
| JP | 2000-137239 A | * | 5/2000 | ......... | G02F 1/1345 |
| JP | 2000-321591 A | * | 11/2000 | ......... | G02F 1/1345 |

* cited by examiner

*Primary Examiner*—Andrew Schechter
(74) *Attorney, Agent, or Firm*—Scully, Scott, Murphy & Presser

(57) ABSTRACT

To make the test probe not directly in contact with the electrode pads for the semiconductor chip mounting, without using an advanced technology for making the pitch of electrode pads narrower, and remove the chip mounting failures such as scratching of electrode pads caused by testing, adherence of impurity particles, electrical corrosion.

The electrode pads 13 formed on the distal ends of the external leads 5 for press-connecting the input electrodes 12 of the semiconductor chip 6 are disposed at both sides (shown as L1) of the semiconductor chip 6. The terminal-electrode leads 2 from the electrode pads 3 pass under the semiconductor chip 6 while keeping a pitch of the electrode pads 3. The test electrode pads 4 are disposed in alternate arrangement on the distal ends of terminal-electrode leads 2. The test electrode pads 4 may be disposed in alternate arrangement in three steps or more of multiple steps.

5 Claims, 5 Drawing Sheets

LCD DEVICE HAVING TEST CONTACT PADS

BACKGROUND OF THE INVENTION (a) Field of the Invention

The present invention relates to a liquid crystal display (LCD) device having test contact pads for testing the LCD panel, and more particularly, to the structure of a LCD device for testing the LCD panel without damaging electrodes of the LCD device.

(b) Description of a Related Art

Methods for mounting a drive semiconductor chip for driving a LCD panel in a current LCD device include a TAB (tape automated bonding) technique and a COG (chip-on-glass) technique. The TAB technique is such that the drive semiconductor chip is mounted on a TAB tape which is then connected to electrode pads formed on the LCD panel. The COG technique is such that the drive semiconductor chip is directly connected to the electrode pads of the LCD panel. The latter has advantages of smaller dimensions and lower costs compared to the former.

In a LCD panel using the COG technique, since the electrode pads must be formed corresponding to the arrangement of the output electrodes of the drive semiconductor chip, design for a smaller pitch and smaller dimensions of the electrode pads are developed. In general, the pitch of output electrodes of the drive semiconductor chip is tens of micrometers ($\mu$m). For example, for a drive semiconductor chip having a side length of 20 mm and 400 in number of output electrodes disposed on the side, the pitch of the output electrodes is as small as 50 $\mu$m, as obtained by a simple arithmetic calculation.

Thus, in a test for a COG-based LCD panel before mounting thereon a drive semiconductor chip, a test probe is used which has input/output probe electrodes arranged at a pitch of tens of micrometers. However, such a test probe is difficult to manufacture, and a short-circuit failure is often caused in the conventional technique by the small pitch, involving a failure in the test operation such as a short-circuit failure.

In addition, since a high accuracy is required during the test operation in the alignment between the probe electrodes and the electrode pads (contact pads) having a small pitch and small dimensions, it takes a long time to align the probe electrodes with respect to the contact pads. Thus, there is a problem low throughput in the test operation.

The mechanical contact between the probe electrodes and the contact pads in the LCD panel may damage the contact pads in the LCD panel by abrasion of surface or attachment of impurities thereon. This may cause an electric malfunction in connection between the electrode pads and the output electrodes of the drive semiconductor chip to be mounted later.

In the test operation, an electrical-chemical reaction may arise to cause a corrosion or melting in the contact pads if a voltage of several volts or more is applied to the test probe in a moisture ambient. This problem is highly probable especially in the case of an active matrix LCD panel, because a high voltage around 10 volts is applied to the scan lines in the LCD panel.

Patent Publication JP-A-6-110072 describes a technique for solving the above problems in testing a LCD panel having the COG structure, wherein openings for the contact pads in the LCD panel have a larger length compared to the space between the contact pads in the LCD panel.

More specifically, with reference to FIG. 1 showing a partial front view of the LCD panel described in the publication, the LCD panel has a pair of glass substrates 11 and 21 for defining a plurality of pixel areas not shown, and a LC layer sandwiched therebetween. The counter substrate 21 has a window 25 for mounting the drive semiconductor chip 16 on the TFT substrate 11. The opening 4 is formed for exposing each internal lead 12 which connects the scan line or signal line formed on the TFT substrate 11 in the display area thereof and the electrode pads 13, whereby the probe electrode is contacted with the internal lead 12 through the opening 4 during the test operation. The opening 4 has a width which is somewhat smaller than the width of the internal lead 12, and a length which is larger than the space between adjacent internal leads 12.

A probe electrode is contacted with the internal lead 12 at the area within each opening 4 shown by hatching, wherein the probe contact areas are arranged in a staggered arrangement with respect to the centers of the openings 4. The staggered arrangement of the probe contact areas allows conventional probe electrodes to contact portions of the internal leads (or contact pads) 12 arranged at a small pitch without undesired electrical contact between the probe electrodes.

In addition, the location of the probe contact area which is apart from the electrode pad 13 affords the advantage of avoiding a short-circuit failure even in the case of abrasion of surfaces or attachment of impurities on the internal leads 12 by the contact of the probe electrodes.

The proposed structure of the LCD device, however, has yet a problem of disconnection or open-circuit failure of the internal leads 12 occurring at the probe contact area due to the abrasion or corrosion caused by the contact between the probe electrode and the internal lead 12. The disconnection of the internal lead 12 causes a malfunction of display image on the LCD panel due to the absence of signal transmission to the scan line or signal line.

SUMMARY OF THE INVENTION

In view of the above, it is an object of the present invention to provide a structure for testing a LCD panel in a LCD device with a high reliability or without involving damages on the internal leads or electrode pads of the LCD panel, such as abrasion, attachment of impurities and corrosion in the internal leads of the LCD panel.

The present invention provides a LCD device including: a LCD panel having first and second glass substrates for defining a plurality of pixels arranged in a matrix, and a LC layer sandwiched between the first glass substrate and the second glass substrate; and a drive semiconductor chip mounted on a mounting area of the first or second glass substrate for driving the LCD panel, the drive semiconductor chip having a plurality of input electrodes and a plurality of output electrodes, the first glass substrate mounting thereon a plurality of internal leads, a plurality of extensions each extending from the internal leads, a plurality of contact pads each formed at one of the extensions, a plurality of external leads connected to external terminals of the LCD panel, and a plurality of electrode pads each disposed at an end portion of one of the internal leads or one of the external leads, the electrode pads being electrically connected to the input and output electrodes of the semiconductor chip.

In accordance with the LCD device of the present invention, since the contact pads are disposed on the extension of the internal lead, the abrasion of surface or corrosion of the contact pads do not cause any malfunction in the internal lead or the electrode pad. Thus, normal operation for the test of the LCD panel can be obtained. In addition, since the pitch of the contact pads may be designed larger than the pitch of the electrode pads, a safe test operation can be conducted without a short-circuit failure.

PREFERRED EMBODIMENTS OF THE INVENTION

Figure 1:
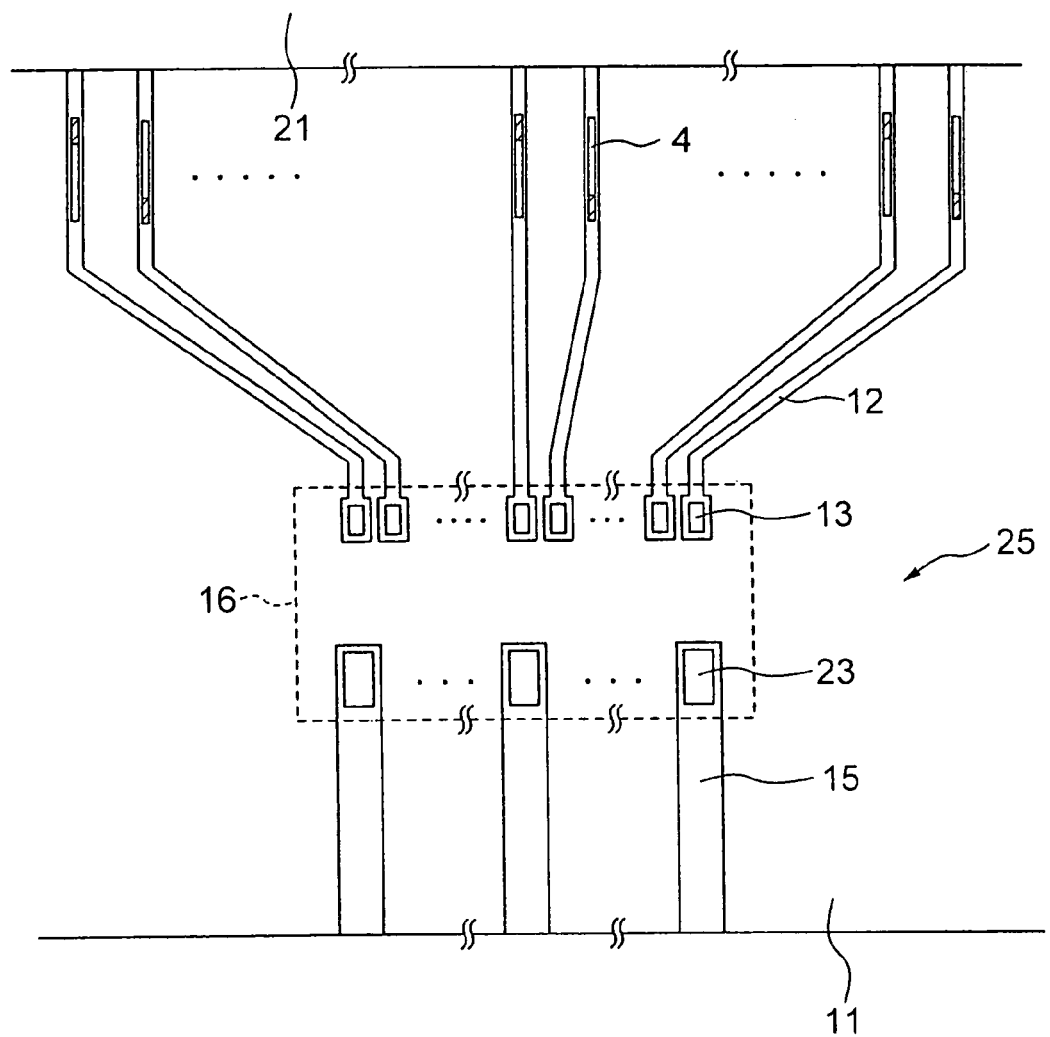
FIG. 1 is a partial front view of a conventional LCD device.

Now, the present invention is more specifically described with reference to accompanying drawings, wherein similar constituent elements are designated by similar reference numerals throughout the drawings.

Figure 2:
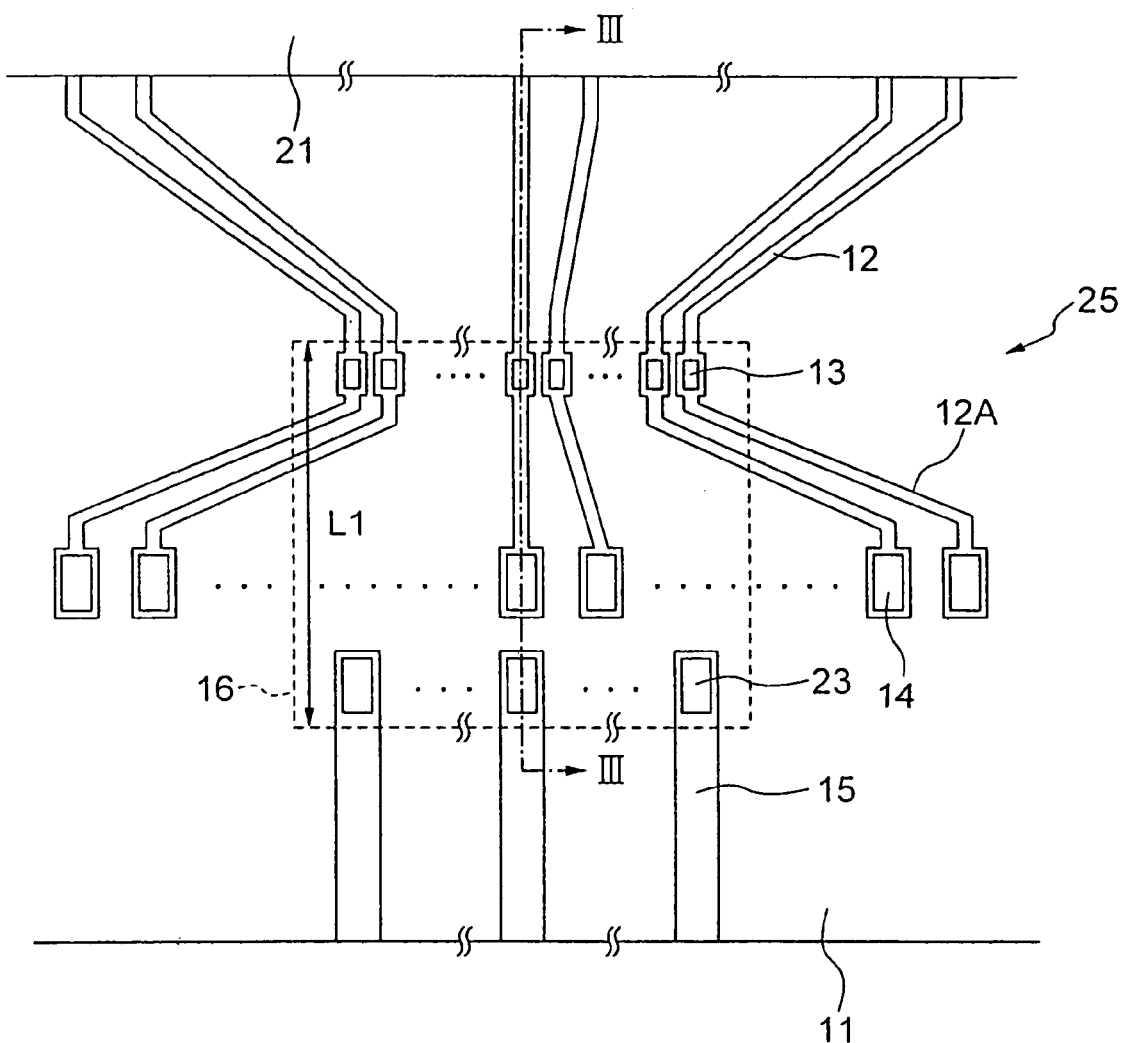
FIG. 2 is a partial front view of a LCD device according to a first embodiment of the present invention.
Figure 3:
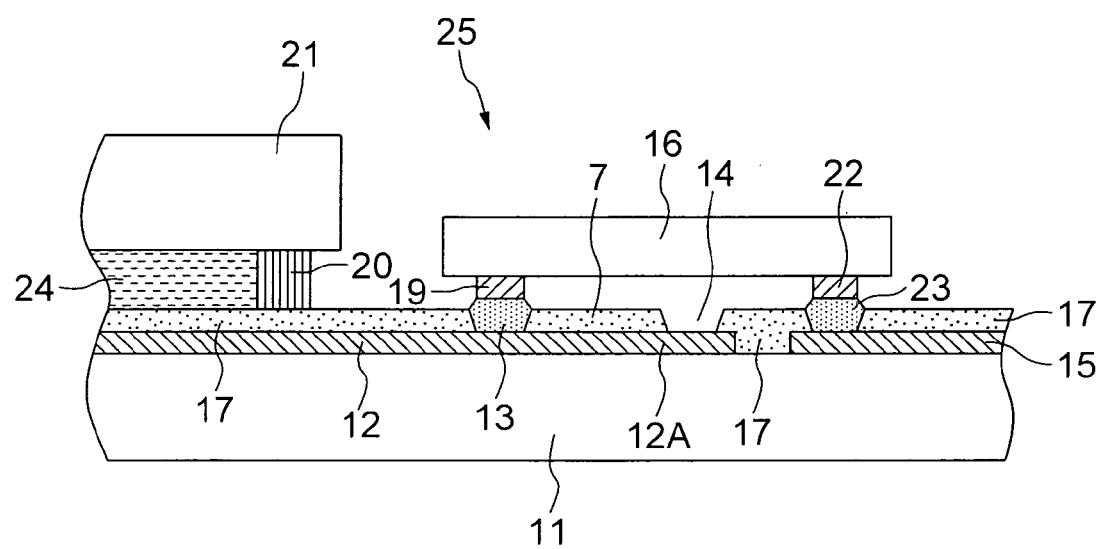
FIG. 3 is a sectional view of the LCD device of FIG. 2, taken along line III—III in FIG. 2.

Referring to FIGS. 2 and 3 showing the vicinity of a drive semiconductor chip in a LCD device as a front view and a sectional view thereof, respectively, the LCD device includes a TFT glass substrate 11, a counter glass substrate 21, and a LC layer 24 sandwiched therebetween, for defining a plurality of pixel areas arranged in a matrix in a display area (not shown). The display area includes a plurality scan lines and a plurality signal lines disposed in a lattice structure for driving each pixel in the display area. The counter glass substrate 21 has a window 25 for mounting the drive semiconductor chip 16 on the TFT substrate 11 after testing the LCD panel without the drive semiconductor chip 16.

The TFT substrate 11 mounts thereon internal leads 12 for connecting the drive semiconductor chip 16 with the scan lines or signal lines formed on the TFT substrate 11 in the display area of the LCD panel. The drive semiconductor chip 16 has input electrodes 22 and output electrodes 19 thereon, which are adhered by pressure or thrust force onto electrode pads 13 of the LCD panel. The electrode pads 13 for the output electrodes 19 of the chip 16 are formed on the internal leads 12 apart from the distal ends thereof. The electrode pads 13 are arranged at a pitch of several tens of micrometers corresponding to the arrangement of the output electrodes 19 of the semiconductor chip 16. This means that the internal leads 12 are crowded in the vicinity of the mounting area for mounting the semiconductor chip 16. The LCD panel mounts external leads 15 for connecting external terminals of the LCD panel and the input electrodes 23 of the drive semiconductor chip 16.

Each internal lead 12 has an extension 12A extending from the electrode pads 13, the distal end of the extension 12A being formed as a contact pad 14 for use in testing the LCD panel before mounting thereon the drive semiconductor chip 16.

The pitch of the internal leads 12 is larger in the vicinity of the distal end of the extension 12A than in the vicinity of the electrode pads 13. That is, the pitch of the extension 12A of the internal leads 12 in the vicinity of the distal ends is comparable to the pitch of the scan lines or signal lines formed in the display area of the LCD panel. Accordingly, the contact pads 14 are arranged at a pitch of 100 $\mu$m which is generally employed for arranging the scan lines or signal lines, namely the pitch of the pixels or color elements. The contact pads 14 are arranged in a line passing below the drive semiconductor chip 16.

In fabrication of the LCD panel of FIGS. 2 and 3, a transparent conductive film, such as made of indium-tin-oxide (ITO), and/or a metallic film, such as made of Al, Ta, Ti, Mo and Cr is deposited on the TFT substrate 11. In this embodiment, the conductive layer has a layered structure including an underlying metallic film and an overlying transparent conductive film having a high anti-oxidation property.

The conductive film is then subjected to patterning using a photolithographic technique to form the internal leads 12, electrode pads 13, contact pads 14, electrode pads 23 and external leads 15.

Subsequently, a protective film 17 made of $SiO_2$ or SiNx is deposited on the entire area of the TFT substrate 11 for covering the internal leads 12, external leads 15, electrode pads 13 and 23 and contact pads 14. Portions of the protective film 17 covering the electrode pads 13 and 23 and the contact pads are then selectively removed by etching using a photolithographic step for forming openings.

The drive semiconductor chip 16 is mounted on the TFT substrate, with the input electrodes 22 and the output electrodes 19 of the drive semiconductor chip 16 being adhered onto the electrode pads 23 and 13 by using a conductive adhesive or an anisotropic resin.

Before mounting the semiconductor chip 16 onto the LCD panel, the LCD panel is subjected to a test operation, which examines absence of defects such as an open-circuit failure or a short-circuit failure in the scan lines, signal lines, internal leads and external leads, or attachment of impurities in the display area. The test also examines safe operation of the switching elements in the case of an active matrix LCD panel. The test is generally conducted by operating the LCD panel as a module and observation of the image displayed on the LCD panel.

In the first embodiment, the contact pads 14 disposed apart from the electrode pads 13 and at the extensions of the internal leads 12 allow the LCD panel to be substantially free from a malfunction irrespective of occurrence of abrasion, attachment of impurities and corrosion of contact pads during the test of the LCD panel.

In addition, the pitch of extensions 12A of the internal leads 12, which is as high as around 100 $\mu$m, enables conventional probe electrodes to test the LCD panel with high reliability and high throughput irrespective of a smaller pitch which is around tens of micrometers between the electrode pads 13 for mounting the drive semiconductor chip 16.

Figure 4:
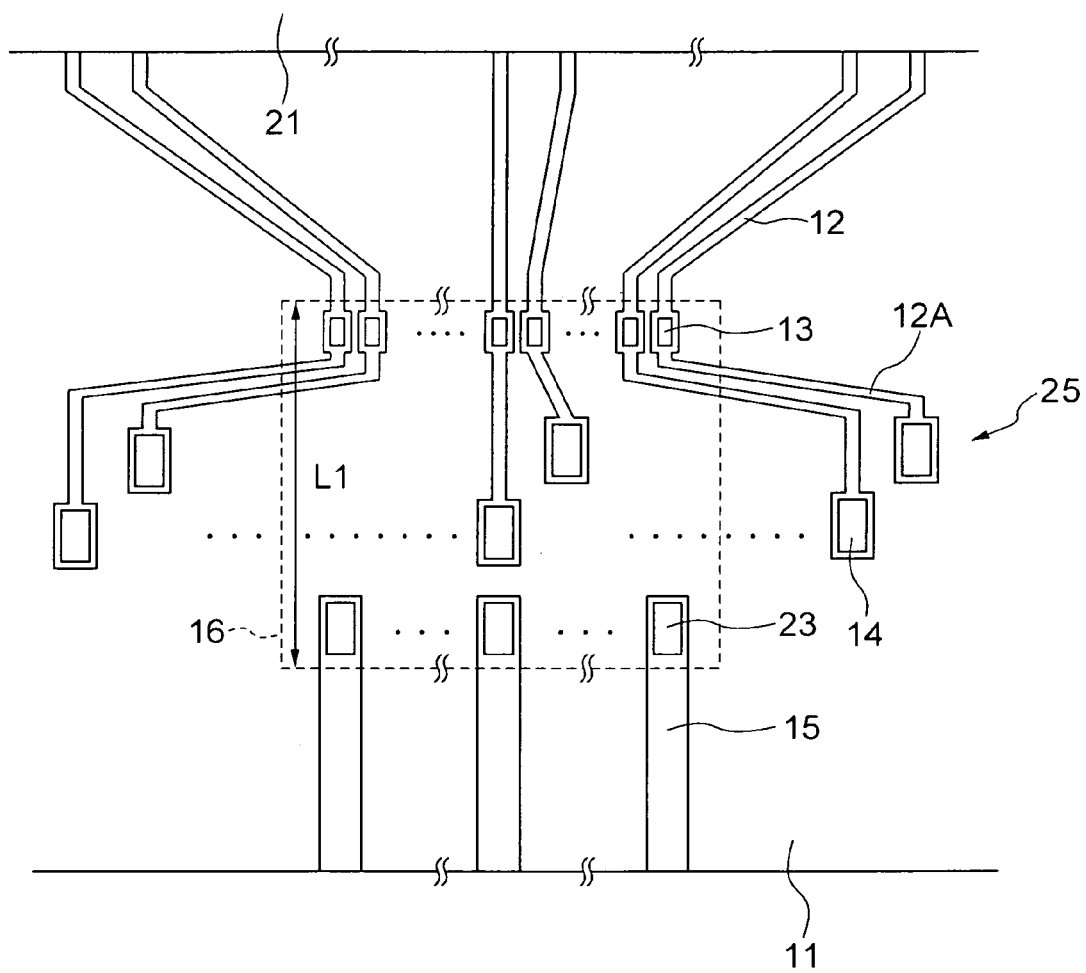
FIG. 4 is a partial front view of a LCD device according to a second embodiment of the present invention.

Referring to FIG. 4, a LCD device according to a second embodiment of the present invention is similar to the first embodiment except that the contact pads 14 are disposed at the extension 12A of the internal leads 12 in a staggered arrangement in the present embodiment.

It is to be noted that the pitch of pixels in the current LCD panel is around 300 $\mu$m and three primary color elements are disposed in each pixel. Assuming that each pixel is divided into three element stripes in a single direction, the pitch of the color elements is around 100 $\mu$m. For a LCD panel having a higher resolution, the pitch of the color elements may be reduced down to around 60 $\mu$m or lower.

In the first embodiment, the pitch of the contact pads 14 is practically limited to the pitch of the color elements which is around tens of micrometers. On the other hand, the staggered arrangement of the contact pads 14 in the present embodiment allows a smaller pitch of the contact pads 14, whereby a higher resolution can be obtained without involving errors in the test operation while assuring a constant throughput.

Figure 5:
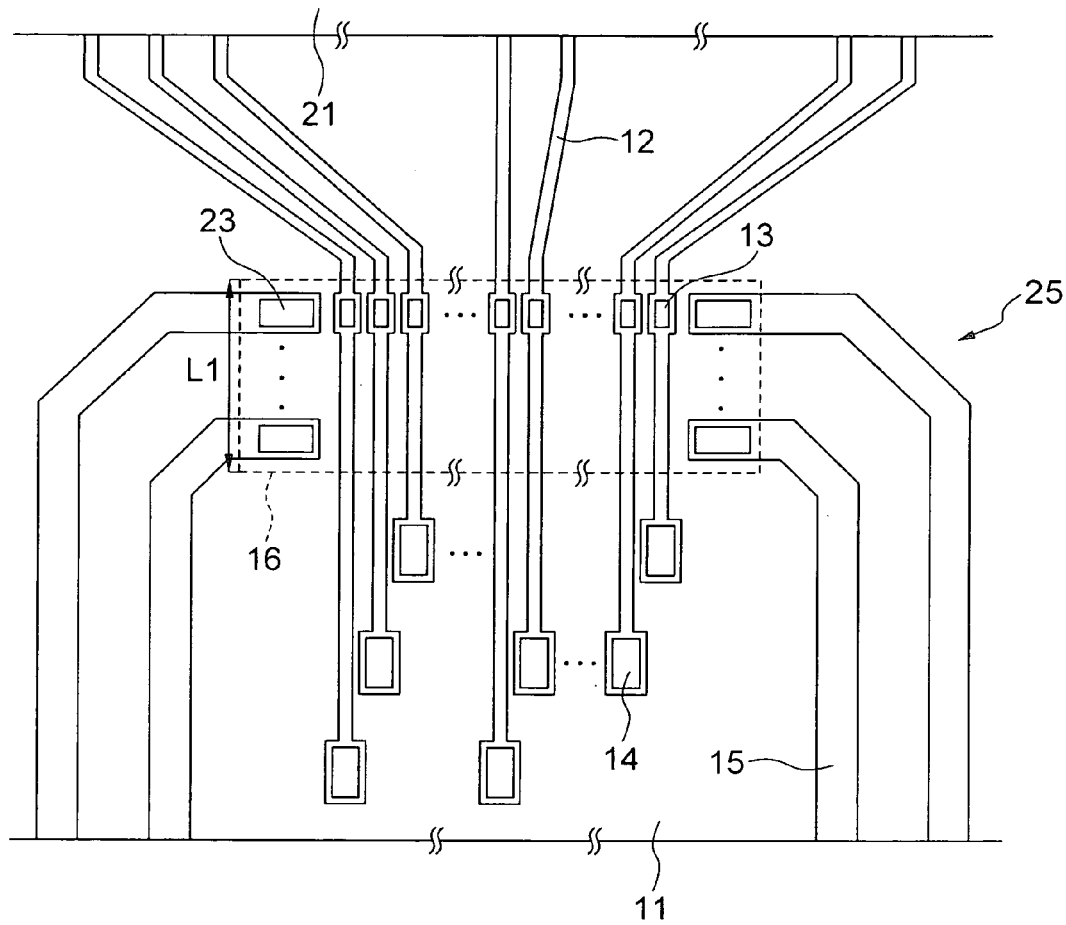
FIG. 5 is a partial front view of a LCD device according to a third embodiment of the present invention.

Referring to FIG. 5, a LCD device according to a third embodiment of the present invention is similar to the first embodiment except for the arrangement of the electrode pads 13 and the contact pads 14.

More specifically, the electrode pads 23 of the LCD panel for mounting thereon input electrodes 22 of the drive semiconductor chip 16 are arranged in the vicinity of the sides (shorter sides) other than the sides, in the vicinity of which electrode pads 23 for mounting thereon output electrodes 19 of the drive semiconductor chip 16. The external leads 15 are separated into two groups with a space disposed therebetween. The extensions 12A of the internal leads 12 extend toward the space between the groups of the external leads 15, passing below the drive semiconductor chip 16.

The contact pads 14 are disposed in a two-step staggered arrangement, wherein the extension 12A of the internal leads 12 have three different lengths for arranging the contact pads 14 at three different locations as viewed perpendicularly to the extensions 12.

In the first and second embodiments, the internal leads 12 and the external leads 15 are disposed on the shorter sides substantially perpendicular to the extending direction of the leads 12 and 15, whereby the length of the internal leads 12 are restricted by the dimension of the semiconductor chip 16.

Along with the development of higher resolution of the LCD panel, the dimensions of the drive semiconductor chip are also reduced. For example, if the pitch of color elements is below 50 $\mu$m and the shorter sides of the drive semiconductor chip 16 are below 1 mm, it is difficult to achieve the pitch of the contact pads 14 as high as 100 $\mu$m, for example, for assuring a reliable test irrespective of the staggered arrangement. In other words, it is preferable that the pitches of the contact pads 14 or electrode pads 13 and 23 be 100 $\mu$m or more, in view of preventing the probe electrodes or input and output electrodes 19 and 22 of the semiconductor chip 16 from slipping off the contact pads 14 or electrode pads 13 and 23 during thrusting the probe electrodes or input and output electrodes 19 and 22.

In the staggered arrangement shown in FIG. 4, the distance between a contact pad with respect to the contact pad next to the adjacent contact pads can be made below 100 $\mu$m. If the staggered arrangement has a two-step structure in FIG. 4, the pitch of the contact pads itself can be made below 100 $\mu$m.

In the third embodiment, the lengths of the extensions 12A of the internal leads 12 may be as large as several millimeters, whereby the number of steps of staggered arrangement can be increased compared to the structure shown in FIG. 4. In FIG. 5, although the two-step staggered arrangement is exemplified, the number of steps can be more than two.

For the two-step staggered arrangement shown in FIG. 5, if the pitch of the color elements is below 50 $\mu$m, 100 $\mu$m can be obtained for the pitch of the contact pads 14.

All the contact pads 14 are disposed outside the mounting area for the drive semiconductor chip 16 as shown in FIG. 5. In this case, the contact pads 14 can be used for test pads during testing the connections or signal transmissions between the drive semiconductor chip 16 and the LCD panel.

Since the above embodiments are described only for examples, the present invention is not limited to the above embodiments and various modifications or alterations can be easily made therefrom by those skilled in the art without departing from the scope of the present invention. For example, the semiconductor chip may be mounted on the counter glass substrate instead of the TFT substrate.

What is claimed is:

1. A liquid crystal display (LCD) device comprising:
   a LCD panel including first and second glass substrates for defining a plurality of pixels arranged in a matrix, and a LC layer sandwiched between said first glass substrate and said second glass substrate, and
   a drive semiconductor chip mounted on a mounting area of said first or second glass substrate for driving said LCD panel, said drive semiconductor chip having a plurality of input electrodes and a plurality of output electrodes, said first glass substrate mounting thereon a plurality of internal leads, a plurality of extensions each extending from said internal leads to form a distal end of said each extension, a plurality of contact pads each formed on one of said extensions, a plurality of external leads connected to external terminals of said LCD panel, and a plurality of electrode pads each disposed at an end portion of one of said internal leads, said electrode pads being electrically connected to said input and output electrodes of said semiconductor chip, and
   said contact pads are arranged at a pitch which is larger than a pitch of said electrode pads for said internal leads, the pitch of said internal leads being larger in the vicinity of the distal end of the extension than in the vicinity of said electrode pads,
   wherein at least one of said contact pads is disposed inside said mounting area.

2. The LCD device as defined in claim 1, wherein said contact pads are arranged in a staggered arrangement.

3. A liquid crystal display (LCD) device comprising:
   a LCD panel including first and second glass substrates for defining a plurality of pixels arranged in a matrix, and a LC layer sandwiched between said first glass substrate and said second glass substrate, and
   a drive semiconductor chip mounted on a mounting area of said first or second glass substrate for driving said LCD panel, said drive semiconductor chip having a plurality of input electrodes and a plurality of output electrodes, said first glass substrate mounting thereon a plurality of internal leads, a plurality of extensions each extending from said internal leads, a plurality of contact pads each formed on one of said extensions, a plurality of external leads connected to external terminals of said LCD panel, and a plurality of electrode pads each disposed at an end portion of one of said internal leads, said electrode pads being electrically connected to said input and output electrodes of said semiconductor chip, and
   said contact pads are arranged at a pitch which is substantially equal to a pitch of scan lines or signal lines disposed for driving said pixels,
   wherein said contact pads are arranged in a two-stepped staggered arrangement.

4. A liquid crystal display (LCD) device comprising:
   a LCD panel including first and second glass substrates for defining a plurality of pixels arranged in a matrix, and a LC layer sandwiched between said first glass substrate and said second glass substrate, and
   a drive semiconductor chip mounted on a mounting area of said first or second glass substrate for driving said LCD panel, said drive semiconductor chip having a plurality of input electrodes and a plurality of output electrodes, said first glass substrate mounting thereon a plurality of internal leads, a plurality of extensions each extending from said internal leads to form a distal end of said each extension, a plurality of contact pads each formed on one of said extensions, a plurality of external leads connected to external terminals of said LCD panel, and a plurality of electrode pads each disposed at an end portion of one of said internal leads, said electrode pads being electrically connected to said input and output electrodes of said semiconductor chip, and said contact pads are arranged at a pitch which is larger than a pitch of said electrode pads for said internal leads, the pitch of said internal leads being larger in the vicinity of the distal end of the extension than in the vicinity of said electrode pads, wherein said contact pads are arranged substantially in a line below said drive semiconductor chip.

5. A liquid crystal display (LCD) device comprising:

a LCD panel including first and second glass substrates for defining a plurality of pixels arranged in a matrix, and a LC layer sandwiched between said first glass substrate and said second glass substrate, and a drive semiconductor chip mounted on a mounting area of said first or second glass substrate for driving said LCD panel, said drive semiconductor chip having a plurality of input electrodes and a plurality of output electrodes, said first glass substrate mounting thereon a plurality of internal leads, a plurality of extensions each extending from said internal leads, a plurality of contact pads each formed on one of said extensions, a plurality of external leads connected to external terminals of said LCD panel, and a plurality of electrode pads each disposed at an end portion of one of said internal leads, said electrode pads being electrically connected to said input and output electrodes of said semiconductor chip, and said contact pads are arranged at a pitch which is substantially equal to a pitch of scan lines or signal lines disposed for driving said pixels, wherein said contact pads are arranged substantially in a line below said drive semiconductor chip.

* * * * *